Figure 5:
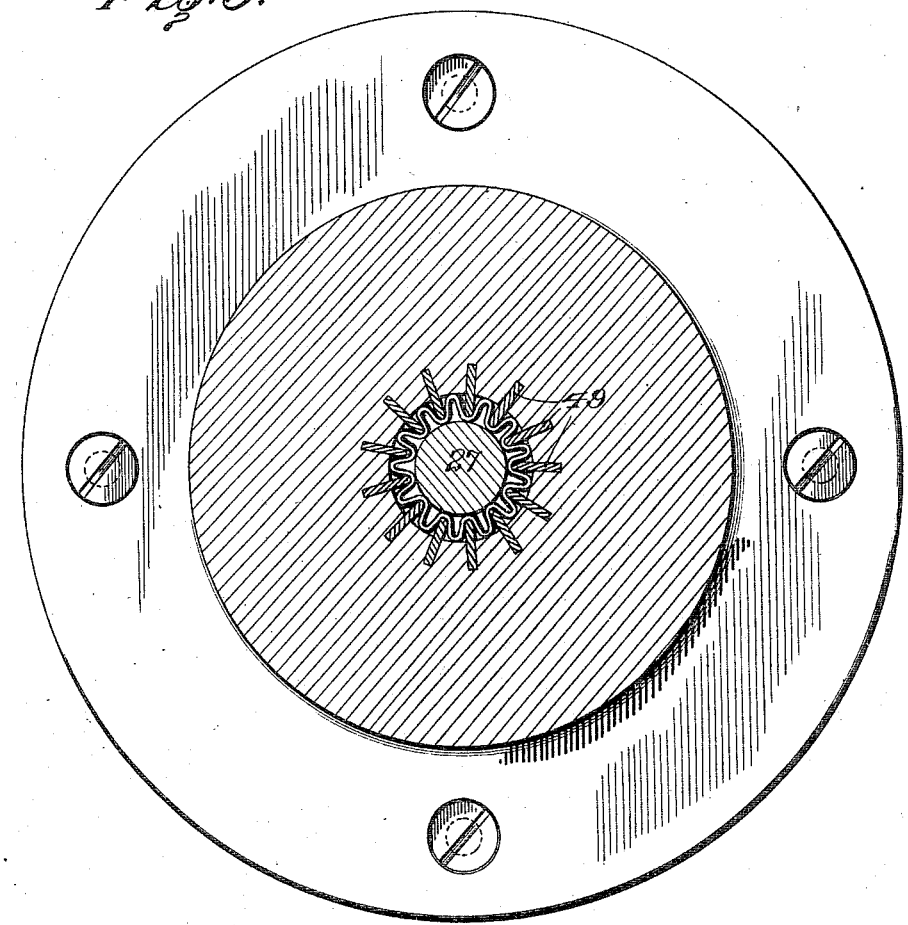

A. JOHNSTON.
METHOD OF MAKING GEARING.
APPLICATION FILED JULY 12, 1909.
985,905.
Patented Mar. 7, 1911.
4 SHEETS—SHEET 1.
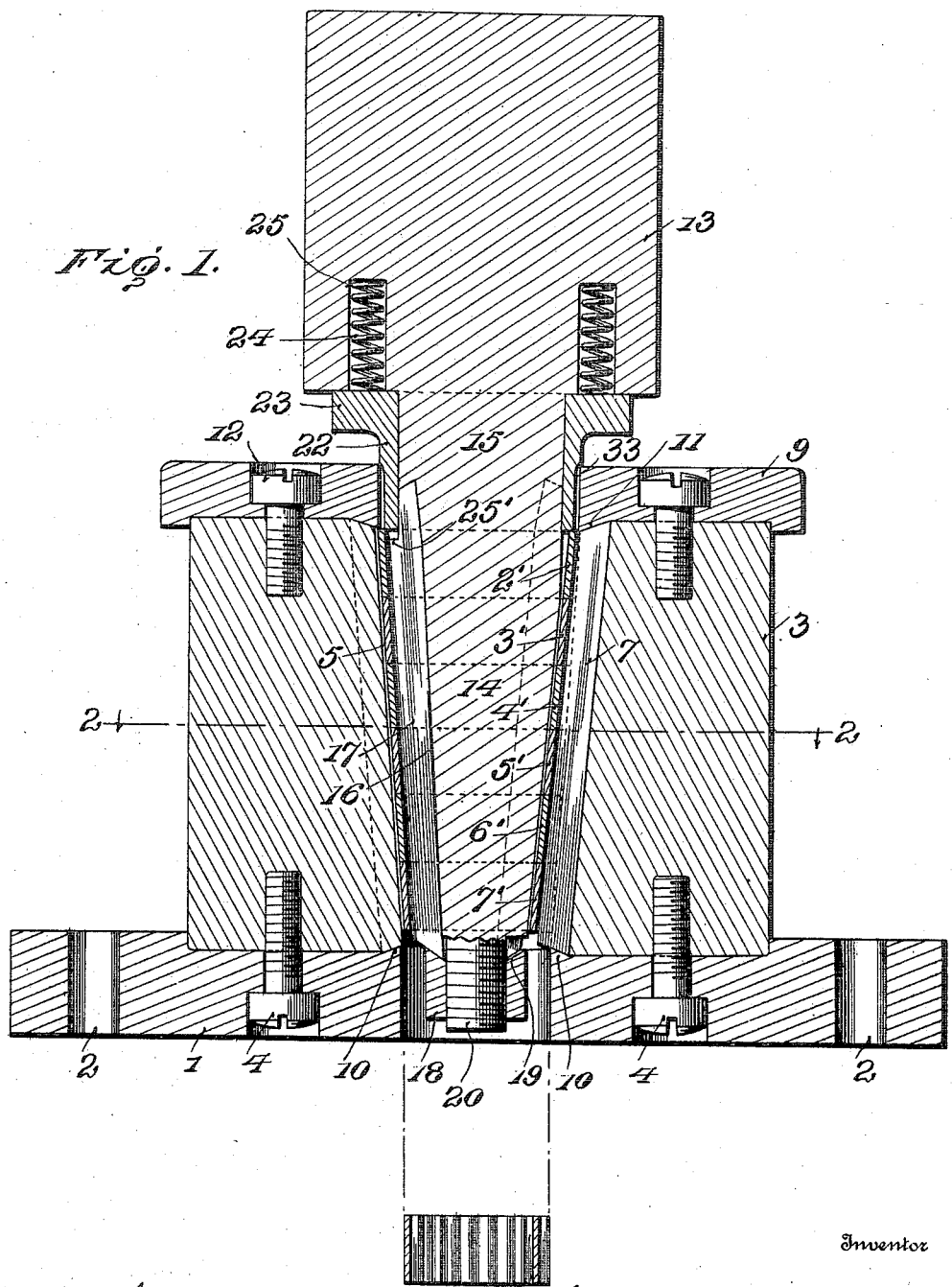

A. JOHNSTON.
METHOD OF MAKING GEARING.
APPLICATION FILED JULY 12, 1909.
985,905.
Patented Mar. 7, 1911.
4 SHEETS—SHEET 2.
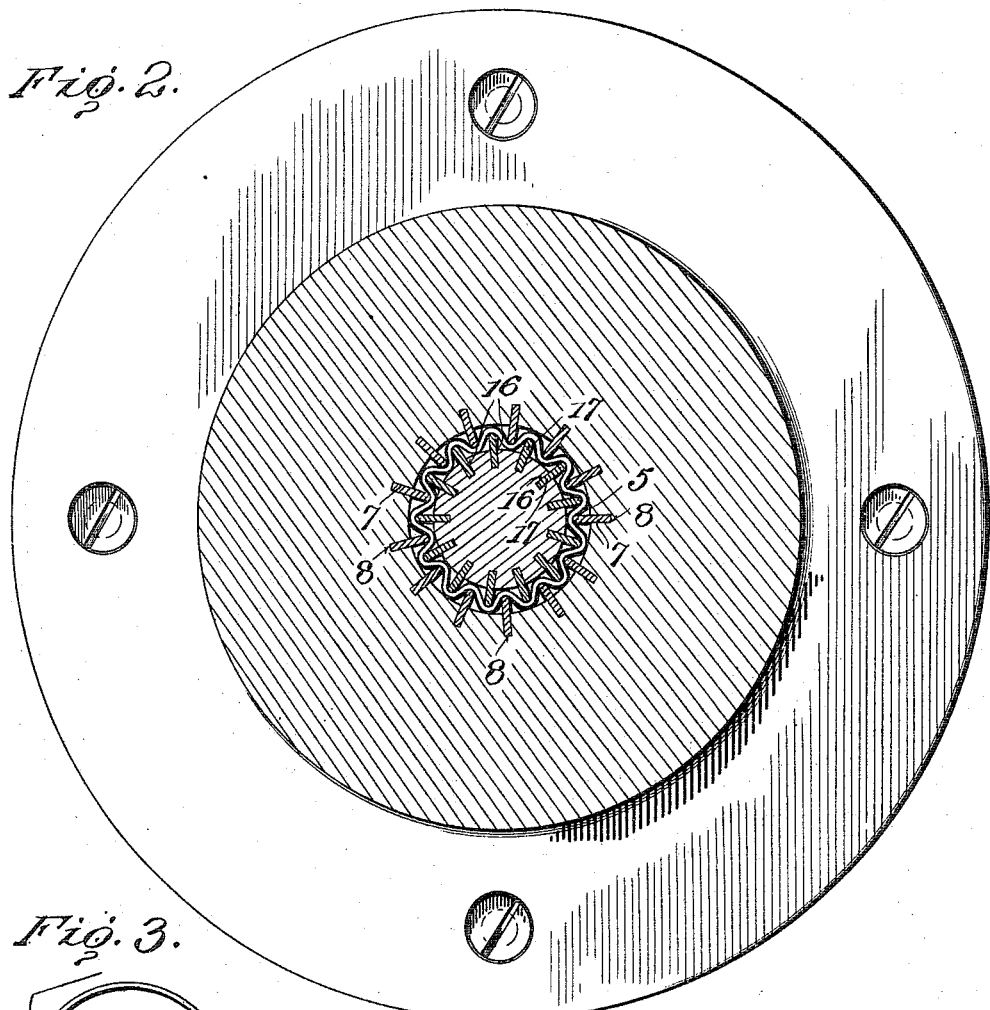
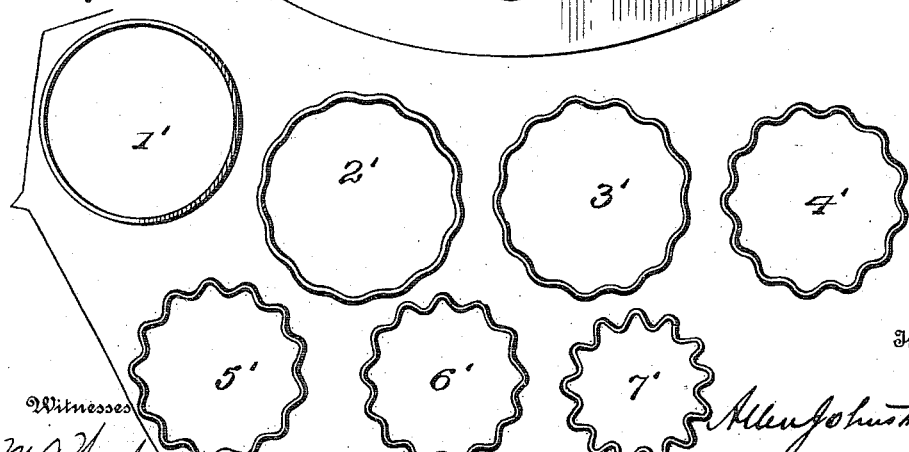

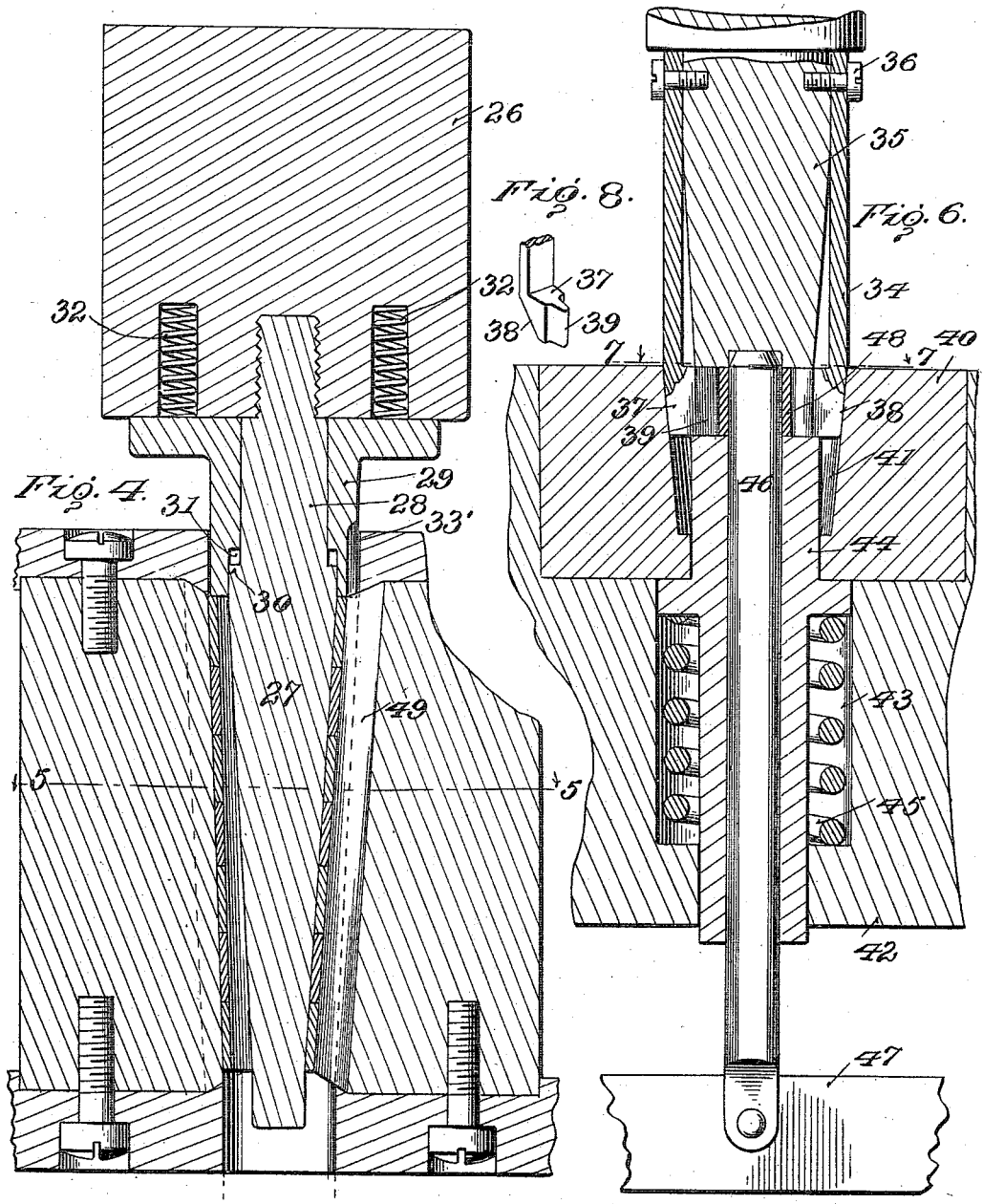

A. JOHNSTON.
METHOD OF MAKING GEARING.
APPLICATION FILED JULY 12, 1909.

985,905.

Patented Mar. 7, 1911.
4 SHEETS—SHEET 4.

Inventor
Allen Johnston,
By Mauro, Cameron, Lewis & Massie
Attorneys

Witnesses
M. A. Hood
R. C. Fitzhugh

UNITED STATES PATENT OFFICE.

ALLEN JOHNSTON, OF OTTUMWA, IOWA.

METHOD OF MAKING GEARING.

985,905.  Specification of Letters Patent.  Patented Mar. 7, 1911.

Application filed July 12, 1909. Serial No. 507,231.

*To all whom it may concern:*

Be it known that I, ALLEN JOHNSTON, a resident of Ottumwa, Iowa, have invented a new and useful Improvement in Methods of Making Gearing, which invention is fully set forth in the following specification.

This invention relates to the manufacture of sheet-metal gearing and has for its object to provide a method whereby gearing of this kind may be cheaply and expeditiously made while securing a product of superior quality.

In accordance with my invention, I take a sheet-metal ring, preferably obtained by cutting a short length from a metal tube such as from a die drawn steel or other metal tube, the diameter of the tube, thickness of wall and the length, corresponding with the dimensions of the gear-wheel desired, and first form in the wall of said ring a series of corrugations, the outer or teeth-forming bends of which have preferably a longer curve than the reëntering bends. I preferably impress all of these corrugations simultaneously in the ring by means of a die punch to secure greater accuracy in spacing of the final teeth, yet it is apparent that these corrugations may be made successively around the ring by any suitable corrugating device. The bends of these corrugations are deepened and narrowed by the successive action of appropriate dies till the crimps are of the desired depth and are properly spaced for closing to form the teeth of the gear. To this end, the sides of the outer bends of the corrugations are subjected to lateral pressure, whereby they are brought into approximate contact with each other to form rough gear teeth. The said bends may, however, be only partially reduced in width to form hollow teeth. I prefer, however, to completely close the bends, since they form more rigid teeth. This operation of closing the corrugations is preferably carried out in stages by passing the corrugated blank through a series of punching dies. After the bends or crimps are closed with the inner surfaces of the walls of the teeth in approximate contact, the gear is subjected to a truing operation, which brings the teeth into regularity of form while forging the walls of the crimps into substantially solid teeth, particularly at the crowns of the teeth. While I prefer cold-forging for this purpose, I may employ hot-forging, such as forging under action of an electric heating current.

In practice I preferably form the preliminary corrugations in the ring blank by forcing it through a cone-shaped die having a plurality of converging corrugating ribs and a centrally disposed conical mandrel punch provided with a like number of converging ribs. By forcing the blank between the two sets of ribs, the wall of the ring is first bent into shallow tapering corrugations which deepen and narrow as the bends or crimps are forced forward between the converging ribs. These tapering corrugations disappear, however, as the corrugated ring emerges from the die in the form of a gear with rough teeth formed by the bends or crimps in the wall of the ring. The bends or crimps are next subjected to lateral pressure whereby the inner surfaces of the bends are forced into more or less contact. The teeth are then trued in any suitable way, as by cold-forging. The gear wheel without further treatment may be mounted on a shaft, or, if preferred, may be mounted on a suitable body portion composed either of sheet metal, as set forth in my application Ser. No. 420,690, filed March 12, 1908, or on any other suitable body.

When it is desired to give special shape to the teeth formed in the manner above described, they may be subjected to grinding or other like operation for this purpose.

My method is equally applicable for making internal gear wheels in which case the internal bends of the corrugations are closed, and of making bevel as well as spur gears.

My method may be practiced by the use of a variety of forms of tools and apparatus, since the particular tools for corrugating, closing, and truing, etc., form no part of the present invention.

For the purpose of illustrating suitable mechanical means for carrying out my method, reference is had to the accompanying drawings, which drawings, however, are employed merely for purposes of illustration and not for the purpose of defining the limits of the invention, reference being had to the claims for this purpose.

Figure 9:
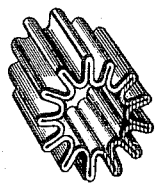
Figure 10:
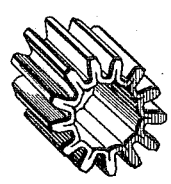

Figure 1 is a view in vertical section of a die punch adapted to effect the initial steps of progressively corrugating or crimping the tubular blank; Fig. 2 is a transverse sectional view of the die punch taken on line 2—2 of Fig. 1; Fig. 3 is a diagrammatic view of a ring blank showing progressive stages in the crimping operation as the blank passes through the first die punch; Fig. 4 is a vertical sectional view of a die punch for closing the crimps; Fig. 5 is a transverse sectional view taken on the line 5—5 of Fig. 4; Fig. 6 is a view in central vertical section of the truing and forging die; Fig. 7 is a detail sectional view taken on the line 7—7 of Fig. 6; Fig. 8 is a detail view of one of the jaws of the truing die; Fig. 9 is a perspective view of a gear after leaving the crimp closing die, and Fig. 10 is a perspective view of the completed gear after leaving the truing die.

Referring to Figs. 1 and 2, the corrugating or crimping die is supported on a base plate 1, having openings 2 for receiving screws or bolts, not shown, for securing the base to a fixed support. The die body 3 is made fast to the base plate 1 by screws 4 countersunk in the plate. Through the die body is a tapering passage 5 into which project a plurality of straight ribs 7, preferably of hardened and finished steel, equally spaced within the die cavity and equal in number to the teeth on the completed gear wheel. Each rib 7 is received by and held in a slot 8 sunk in the die body. The ribs 7 are held in place by a cap 9 and the base plate 1, and to more effectively secure this object, the ends of each rib are beveled, as shown in the rib 7 at the right-hand of Fig. 1, and engage corresponding beveled portions 10, 11 on plate 1 and cap 9, which latter is made fast to the die body by screws 12.

The line of the working face of each rib is given the same inclination to the axis of the die, and each rib has for its full length the same extent of projection into the die cavity, though I may in certain cases give the lower ends of the ribs more projection than at the top in case gear teeth of greater depth are desired.

The punch 13, which is connected to an ordinary ram of a power press, not shown, is provided with a taper mandrel-portion 14 and a cylindrical shank 15. The taper mandrel is provided with a plurality of slots 16, which receive ribs 17, preferably of hardened finished steel, and correspond in number with those of the die. These ribs are held in their slots by a screw-threaded nut 18 having a cone recess 19 which engages the lower beveled ends of the ribs 17 when nut 18 is screwed onto the threaded end 20 of the punch. The upper ends of the ribs are also beveled for fitting the re-entering upper ends of the slots 16. On the shank 15 fits a sleeve 22 having a shoulder 23 bearing against a plurality of springs 24 retained in sockets 25 and normally pressing the sleeve outward. This ring has a slight longitudinal play on shank 15, and is limited in its movement by shoulders 25' cut in ribs 17. The ring 22 fits a circular opening in the cap 9, is of a diameter corresponding to that of the ring blank, and has cut-away portions 33 to permit clearance of ribs 7. Before describing the operation of corrugating or crimping carried out in this die, a detailed description will be given of the closing die and of the truing die.

In Fig. 4 I have shown a die member in all respects like that shown and described above, except that the taper opening for receiving the corrugated rings is smaller.

The punch consists of a head portion 26 having a threaded recess for receiving the threaded upper end of the taper mandrel 27, which is plain, and is of hardened finished steel. The mandrel 27 has a reduced shank 28, over which fits a sleeve 29, which is retained thereon between the head 26 and the shoulder 30 of the mandrel 27, and between which the ring has a slight longitudinal play by reason of the recess 31 in the end of the ring. Springs 32 located in recesses in head 26 are provided which normally press against the rim of the sleeve when the punch is in operative position. Ring 29 also has cut away portions 33' opposite the ribs 49 for permitting it to follow the punch a certain distance into the die.

In Fig. 6 I have illustrated a truing and forging die in which a plurality of spring segments 34 are secured to a holder 35 by means, such as screws 36, and circularly disposed about the same. The lower end of each segment is formed into a segmental shaped shoulder 37 having exteriorly a bevel portion 38 and interiorly a tooth 39 which lies in a plane through the axis of the holder 35. The segments of the set on the holder are closed together by means of a block 40 having a taper opening 41; when the jaws with their exteriorly beveled ends engage the walls of the conical cavity, they are forced inward and closed together, as may be readily seen by an inspection of the drawings. The block 40 is supported on a base 42, in which is a recess 43 for receiving a tubular gear support 44 and a spring 45 adapted to normally force the upper end of the gear support 44 into the taper opening in block 40. The lower end of the gear support extends through the base 42, and is guided thereby. Normally extending through, and slightly beyond the top of the tubular support is an anvil rod 46, over which the work is slipped, and which has pivot connection with a lever 47 for withdrawing the anvil rod from the work 48 when the truing operation is finished.

In carrying out my method of making sheet metal gears in the apparatus above described, I take a sheet metal ring 1', Fig. 3, such as may be obtained by cutting off a short length from a seamless steel tube, the length, diameter of the ring, and thickness of the wall being suitable for the particular gear wheel to be made, and insert it in the die, Fig. 1, with its lower end resting on the inwardly projecting ribs 7. The ribbed punch or mandrel 14 is lowered through the ring blank into the die, bringing the bottom of the spring-pressed sleeve 22 down on top of the upper edge of the blank forcing the blank downward and against the working faces of the downwardly converging crimping ribs 7 and 17. The ring has now impressed in it a series of shallow corrugations, the outer bends of which are tapering from the top to the bottom of the ring, the broader portion at the top and the narrow portion at the bottom. In removing the punch from the die, provision is made for preventing accidental withdrawal of the blank with it. This is effected by means of the spring pressed sleeve 22, which holds the blank down while the ribbed punch moves upward and out of engagement with the blank. A second ring blank is inserted in the die and the corrugating operation is repeated. The second blank now receives its initial corrugations while forcing the first blank downward its own width into a narrower section of the die. The bends in blank 2' are thereby narrowed and deepened by the converging corrugating ribs on the die and mandrel and the cross section of the corrugated ring correspondingly reduced. A series of blanks are thus carried downward at each blow of the punch. In the illustration Fig. 1, the seventh blow completes the operation of corrugating in this die, the blank emerging as shown in vertical cross-section below the exit end of the die. While the rings are within the die, their ribs are tapered as explained above, but this taper is removed when the ring leaves the die, the ribs becoming forced into parallel relation as they pass the lower ends of the corrugating ribs. The successive stages in the crimping operation are illustrated diagrammatically in Fig. 3. Instead of using one die for the crimping operation, it is obvious that a set of separate dies might be employed.

The operation of closing the outer bends of the corrugated blank to form rigid teeth is effected in the closing die illustrated in Fig. 4. The corrugated blank leaving the first die is placed in the closing die with its lower end resting in position to engage ribs 49. The taper member of the mandrel is lowered into the die through the opening of the corrugated blank which is forced down into the die by the advance of the lower end of the sleeve 29, and stops when the punch reaches the lower limit of the stroke. The punch is withdrawn from the die and disengaged from the blank by means of the spring-pressed sleeve 29 in the same manner as that previously explained in describing the operation of the first die. The corrugated blank at the end of the first stroke of the punch has advanced its own width along the ribs 49. During this advance into the die, the outer bends are gradually forced between the converging sides of the ribs 49, thereby causing the walls of the bend to approach. During the closing of the bends, the cross-section of the blank is reduced without, however, materially deepening the spaces between the teeth, because the mandrel is plain or devoid of ribs, and acts to support the inner bends against the pressure of the edges of the ribs 49, as the blank is forced down between the surface of the mandrel and the sides of the ribs. Successive corrugated ring blanks are introduced into the die, and the series of seven blanks, as shown in Fig. 4 are advanced through the die in a continuous manner. The product of this operation is a sheet metal gear, as shown in Fig. 9, with teeth having the adjacent surfaces of the sheet metal on the inner side of each tooth approximately contacting and the teeth of the gear being roughly parallel. To bring the teeth into true alinement and to bring the said surfaces of the walls of the teeth into intimate contact, the rough gear is subjected to the truing and forging operation in the truing and forging-die shown in Fig. 6. The sheet metal gear resulting from the preceding steps of the process is slipped over the end of the anvil rod 46 and rested on the gear support 44. The holder 35 is brought down to engage the beveled ends of the segments with the cone block 40, thereby closing in the segments and engaging the teeth of the segment shoulders with those of the gear wheel on the anvil. The shoulders of the segments engage the upper edge of the gear support, while the top of the anvil rod engages the recessed lower end of the holder 35. A further plunge of the holder into the cone block 40 brings the segments into their truing position, as shown in Fig. 7, thereby forcing the teeth of the gear into a true and uniform position while forging the walls of the teeth rigidly together. By raising the holder, the segments are released from the cone block 40, and by lowering the anvil rod 46 by means of lever 47, the sheet metal gear is ready to be taken from the truing device. The gear teeth are now absolutely true, and are for the greater part of their length practically solid. The gear has the form shown in Fig. 10.

The gear may be subjected to grinding and polishing or other operations for adapting it for special purposes, or it may be mounted on a shaft or other support as it leaves the truing and forging die.

Instead of closing the bends by compressing them till their walls contact, and then truing the teeth, I may true the partially compressed crimps, and thereby produce gears having hollow teeth which are serviceable when the gear is to be filled with a fusible metal.

Obvious changes in the specific details herein described, which will not involve departure from the inventive idea of the method set forth, will suggest themselves to the skilled mechanic, and such obvious changes are designed to be within the scope of the claims.

What I claim is:—

1. The process of making sheet-metal gearing, consisting in providing a sheet-metal ring with corrugations having tapering bends, bringing said tapering bends into parallelism to form rough gear-teeth, and then compressing the walls of said teeth into contact.

2. The process of making sheet-metal gearing consisting in providing a sheet-metal ring with corrugations having tapering bends, bringing said tapering bends into parallelism to form rough gear teeth, and then compressing the walls of said teeth into contact and then truing said teeth under pressure.

3. The process of making sheet-metal gearing consisting in providing a sheet-metal ring with a plurality of corrugations, progressively narrowing said corrugations from end to end and then forging said narrowed corrugations into gear teeth.

4. The process of making sheet-metal gearing consisting in corrugating a sheet-metal ring to form gear teeth approximately alike and closing the bends which are to constitute the gear teeth till the walls of said bends are in substantial contact.

5. The process of making sheet-metal gearing, which consists in forming inital corrugations in a sheet-metal ring, then progressively deepening said initial corrugations, and then narrowing the bends of the corrugations to form gear teeth approximately alike.

6. The process of making sheet-metal gearing which consists in forming initial corrugations in a sheet-metal ring, then progressively deepening said initial corrugations, then narrowing the bends of the corrugations to make gear-teeth approximately alike and then compressing the walls of the teeth into contact.

7. The process of making sheet-metal gearing, which consists in forming initial corrugations in a sheet-metal ring, then progressively deepening said initial corrugations, then narrowing the bends of the corrugations to form rough gear teeth approximately alike, then cold forging said teeth.

In testimony whereof I have signed this specification in the presence of two subscribing witnesses.

ALLEN JOHNSTON.

Witnesses:
R. W. FUNK,
F. A. WRIGHT.

---

Copies of this patent may be obtained for five cents each, by addressing the "Commissioner of Patents Washington, D. C."